(12) United States Patent
Bronk et al.

(10) Patent No.: US 10,473,529 B2
(45) Date of Patent: Nov. 12, 2019

(54) DUCT THERMOMETER

(71) Applicants: Michael D. Bronk, Naperville, IL (US);
Bruce R. Kuhn, Naperville, IL (US)

(72) Inventors: Michael D. Bronk, Naperville, IL (US);
Bruce R. Kuhn, Naperville, IL (US)

(73) Assignee: Klein Tools, Inc., Lincolnshire, IL (US)

( * ) Notice: Subject to any disclaimer, the term of this patent is extended or adjusted under 35 U.S.C. 154(b) by 180 days.

(21) Appl. No.: 15/606,078

(22) Filed: May 26, 2017

(65) Prior Publication Data
US 2018/0340839 A1 Nov. 29, 2018

(51) Int. Cl.
*G01K 1/08* (2006.01)
*G01K 1/14* (2006.01)
*G01K 13/02* (2006.01)

(52) U.S. Cl.
CPC ........... *G01K 1/08* (2013.01); *G01K 1/14* (2013.01); *G01K 13/02* (2013.01); *G01K 2013/024* (2013.01); *G01K 2201/00* (2013.01)

(58) Field of Classification Search
CPC .............................................. G01K 2013/024
See application file for complete search history.

(56) References Cited

U.S. PATENT DOCUMENTS

| | | | | |
|---|---|---|---|---|
| 5,346,784 A | * | 9/1994 | Scheid | G08B 3/1058 429/100 |
| 5,709,476 A | * | 1/1998 | Wu | G01K 1/14 206/306 |
| 5,764,130 A | * | 6/1998 | Straub | G01K 13/02 338/22 R |

OTHER PUBLICATIONS

TPI Product Page showing 315C thermometer, least Archive.org copy dated Mar. 22, 2013 (Year: 2013).*
Images from videos https://www.youtube.com/watch?v=(ZK8Cj6Etz dated Dec. 12, 2011) and https://www.youtube.com/watch?v=ZXW2ZHRTxlo (dated Jun. 30, 2016) showing detail of 315C thermometer (Year: 2016).*
Comment by "Old Pwr" regarding improvement to 315c thermometer, dated 3 years ago as of Jan. 2019 (Year: 2016).*

* cited by examiner

*Primary Examiner* — Clayton E. LaBalle
*Assistant Examiner* — Leon W Rhodes, Jr.

(57) ABSTRACT

The disclosed device is a hand-held probe thermometer which operates to display temperatures sensed by a temperature sensing probe, and a protective probe cover featuring one or more openings to allow for accurate airflow temperature measurements without removing the protective probe cover. The probe cover is also configured to function as a extendable handle for the duct thermometer to allow for an extended reach when taking measurements.

14 Claims, 5 Drawing Sheets

DUCT THERMOMETER

BACKGROUND OF THE INVENTION

The present invention relates to the field of hand-held probe thermometers. Various types of hand-held probe thermometers are commonly used in several industries, particularly in the heating, ventilation, and air-conditioning fields (HVAC). Typical hand-held probe thermometers feature an elongated metallic temperature-sensitive probe which extends from the body of the tool and provides a small voltage to the tool which corresponds to the temperature being sensed. A digital circuit or equivalent is employed to convert the small voltage into a visual temperature display, usually in degrees Fahrenheit or Celsius.

HVAC technicians, building engineers, and various other professionals employ specialized hand-held probe thermometers adapted for use with airflow ducting. These specialized hand-held probe thermometers employ a hard, sharp metal probe designed to punch small holes in ductwork to introduce the temperature-sensitive probe into the air being forced through the duct by the HVAC system. A magnet is often included at the base of the temperature-sensitive probe to allow the thermometer to adhere to metallic ductwork when taking readings. Airflow temperature readings can also be taken without making holes in the ducts where the interior of the system is accessible without penetrating the ductwork. Such thermometers are particularly useful in the HVAC field, where temperature readings must be taken at various points in an HVAC system to ensure proper function of the system as a whole.

In order to protect the temperature-sensitive probe from damage, and to protect users from the sharpened point of the temperature-sensitive probe, a typical hand-held probe thermometer will provide a cover for the temperature-sensitive probe. The probe covers in the prior art are deficient in that the cover prevents the use of the thermometer for taking airflow temperature readings, requiring the user to remove the cover even if piercing the ductwork is not required. The present invention addresses this deficiency by allowing the thermometer to take accurate airflow temperature readings without removing the cover, while still adequately protecting both the temperature-sensitive probe from damage and the user from the sharpened point of the tool.

DETAILED DESCRIPTION

The exemplary embodiments described herein in accordance with the disclosure are applicable to hand-held thermometers that are suitable for use with HVAC systems, though the systems and method in accordance with the disclosure, but may be applicable to any type of handheld thermometer in a multitude of applications.

Figure 1:
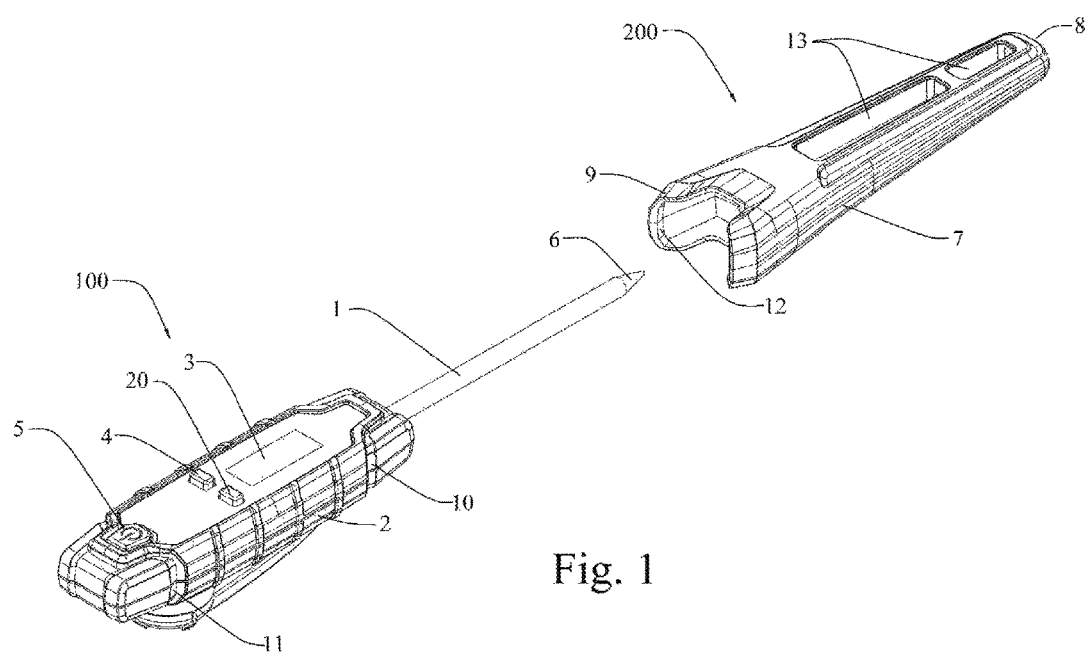
FIG. 1 is a rear top right side perspective view of one embodiment of the invention.

FIG. 1 depicts one aspect of the present invention, a hand-held probe thermometer 100 and a probe cover 200. The hand-held probe thermometer 100 includes a temperature sensing probe 1 extending from a housing 2, a power function button 4 to activate the unit, a digital display 3 to allow a temperature reading (in degrees Fahrenheit or Celsius), a sensing mode button 20, and a power button 5 to activate and deactivate the hand-held probe thermometer. Other configurations of buttons can be used with the invention, possibly including other functions for the tool.

The hand held probe thermometer 100 also has front protruding surfaces 10 and rear protruding surfaces 11 for interface with the probe cover 200. The temperature sensing probe 1 contains a typical thermocouple known in the art, consisting of two wires of different materials (not shown) meeting at the point of the probe 1. Accordingly, it is at the probe tip 6 of the temperature sensing probe 1 that temperature readings are the most accurate. A digital processing circuit (not shown) within the housing 2 detects a small voltage generated by the probe 1 in response to the temperature at the probe tip 6 and provides a readout on the digital display 3 to indicate the temperature detected.

The probe cover 200 features a cover body 7 with a tip end 8 and a tool end 9. A receiving surface 12 located at the tool end 9 of the probe cover 200 is designed to securely engage and "snap onto" the front protruding surface 10 of the hand-held probe thermometer 100 to securely attach the probe cover 200 and the hand-held probe thermometer together, such that the probe cover 200 effectively envelops the temperature sensing probe 1 in a secured position. The probe cover 200 also features one or more openings, in this case elongated slots 13 in opposite sides of the cover body 7. These elongated slots 13 are constructed in a manner to encourage moving air to enter the elongated slots 13 and exit the tool in the elongated slots on the other side. The elongated slots 13 extend far enough into the tip end 8 of the cover body 7 to ensure that the probe tip 6 is exposed adequately to the moving air to take a proper airflow temperature measurement.

Figure 2:
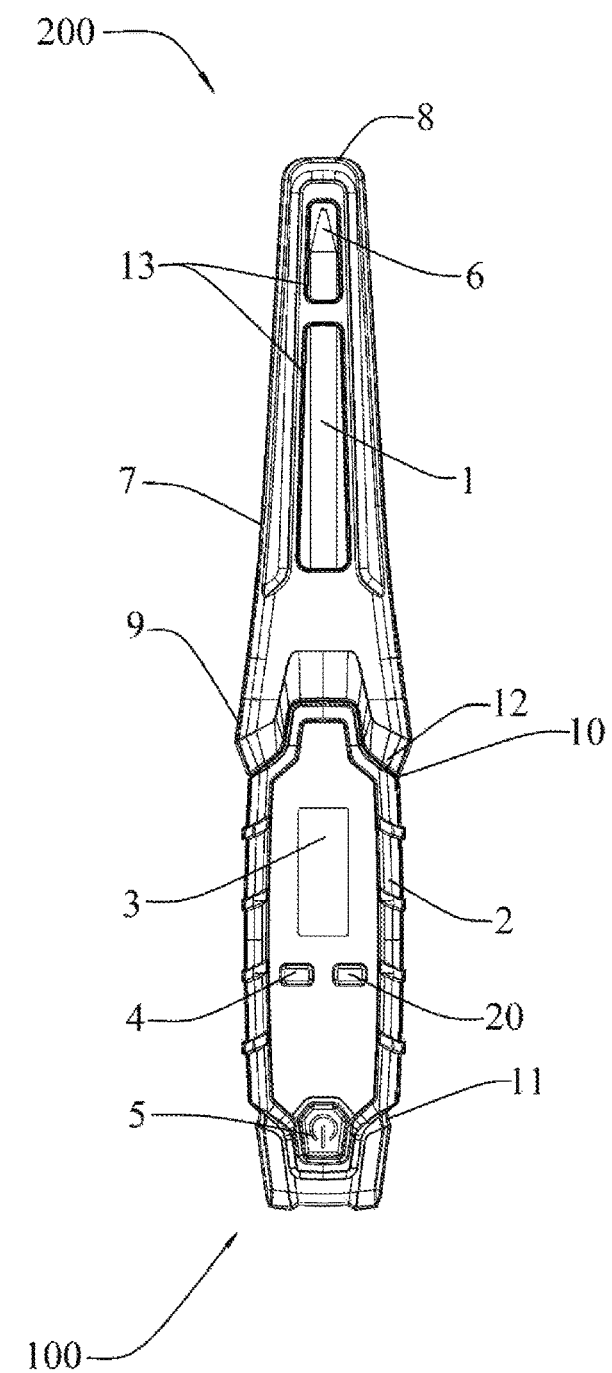
FIG. 2 is a top view of the embodiment shown in FIG. 1.

FIG. 2 depicts the embodiment in FIG. 1 in its covered position as viewed from the top. In this configuration, the receiving surface on the tool end 9 of the cover body 7 is engaged with the front protruding surface 10 of the housing 2, such that the hand-held probe thermometer 100 and the probe cover 200 are secured together. The temperature-sensing probe 1 is still exposed to the air through the elongated slots 13 in the cover body 7. In particular, the probe tip 6 is exposed to the air to allow for quick and accurate temperature readings.

Figure 3:
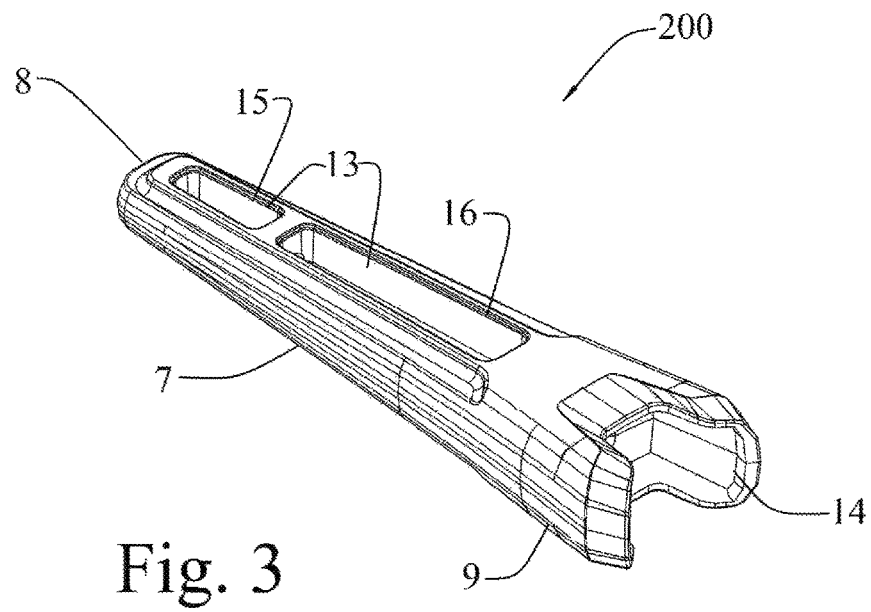
FIG. 3 is a partial rear top left side perspective view of the embodiment shown in FIG. 1.
Figure 4:
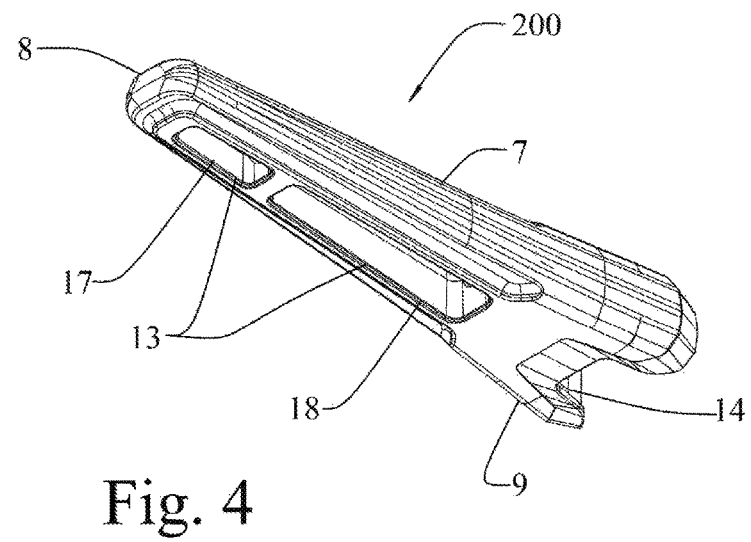
FIG. 4 is a partial front bottom left side perspective view of the embodiment shown in FIG. 1

FIG. 3 and FIG. 4 detail the construction of the probe cover 200. At the tool end 9 of the cover body 7 there is a receptacle 14 adapted to receive the temperature sensing probe 1. In this embodiment the elongated slots 13 are positioned such that airflow into an upper tip side elongated slot 15 and an upper tool side elongated slot 16 flows past the temperature sensing probe 1 and exits the probe cover 200 via a lower tip side elongated slot 17 and a lower tool side elongated slot 18. Because the upper tip side elongated slot and the lower tip side elongated slot are positioned on the cover body 7 such that the probe tip 6 is exposed to airflow, an accurate airflow reading can be taken without detaching the probe cover 200 from the hand-held probe thermometer 100. Although it is the airflow around the probe tip 6 which results in an accurate temperature measurement, the airflow through the lower tool side elongated slot 18 the upper tool side elongated slot 16 serves to prevent the trapping of air within the cover body 7, ensuring that the probe tip 6 is exposed to proper airflow for temperature sensing purposes.

Figure 5:
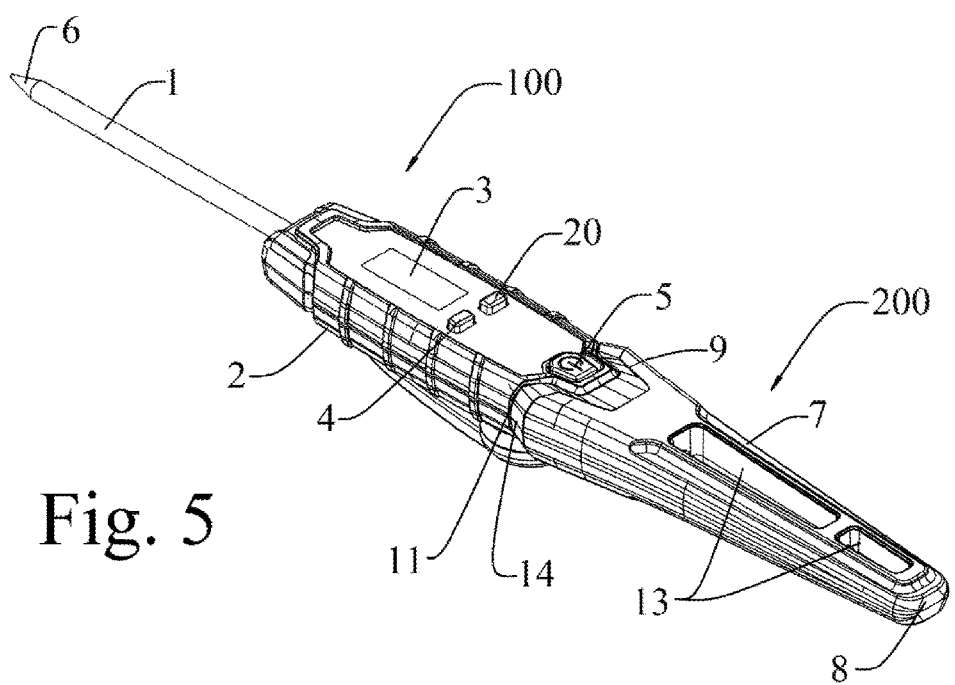
FIG. 5 is a rear top left side perspective view of the embodiment shown in FIG. 1 in an alternate configuration.

FIG. 5 shows an additional feature of the probe cover 200, wherein the rear protruding surface 11 of the housing 2 is also designed to engage the receiving surface 12 on the tool end 9 of the probe cover 200. In this configuration, it will be clearly apparent to those skilled in the art that the probe cover 200 can be used as an extended reach handle. The extended reach allows the user to introduce the temperature sensing probe 7, and especially the probe tip 6, into hard to reach spaces, such as overhead ductwork and floor registers.

Figure 6:
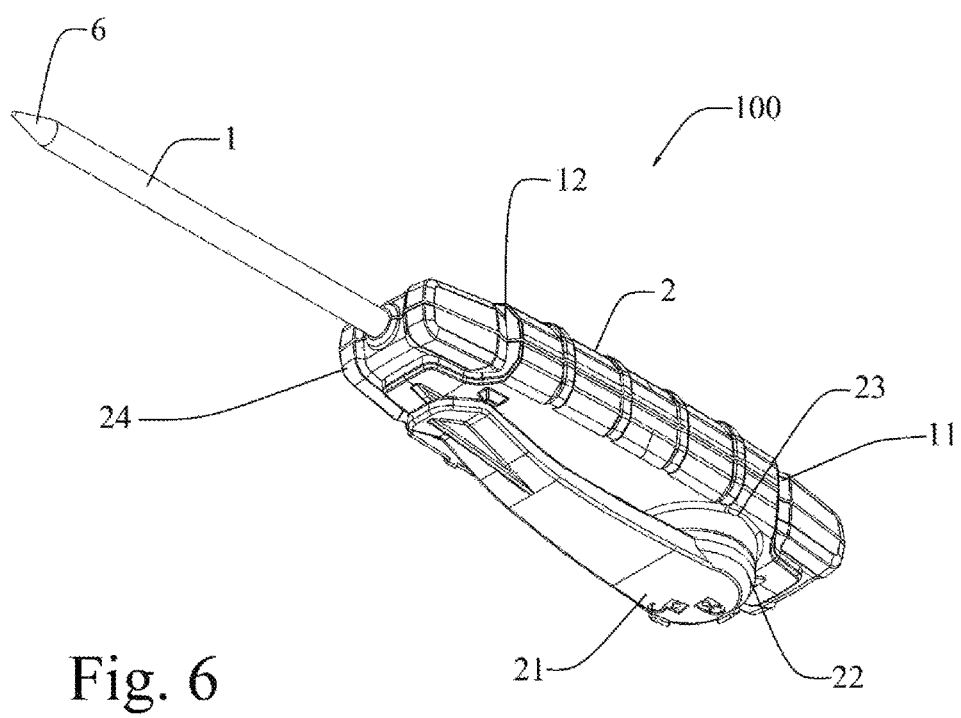
FIG. 6 is a front bottom left side perspective view of the embodiment shown in FIG. 1 in an alternate configuration.

FIG. 6 details the underside of the hand-held probe thermometer 100. Prominently featured in this view is the pocket clip 21, which extends from the cylindrical battery cover 22, which itself mates rotatably with a battery compartment 23 within the housing 2 and locks the battery compartment 23 closed. A magnet (not shown) is located within the housing 2 near the base 24 of the temperature sensing probe 1 in such a position that it may engage the surface of ductwork or other ferrous substances.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A hand-held thermometer comprising:
   a housing;
   a temperature sensing probe engaged to the housing;
   a digital processing circuit disposed within said housing configured to receive a signal from said temperature sensing probe;
   a display connected to said digital processing circuit configured to display a visual indication of temperatures sensed by said temperature sensing probe;
   a probe cover configured to envelop said temperature sensing probe and to securely engage said housing; and
   an opening in said probe cover configured to expose a majority of said temperature sensing probe.

2. The hand-held thermometer of claim 1, wherein an additional opening is disposed opposite said opening on the probe cover.

3. The handheld thermometer of claim 1, wherein said opening exposes the entire width of said temperature sensing probe.

4. The hand-held thermometer of claim 1, wherein said probe cover can be securely engaged to an alternate position on said housing.

5. The hand-held thermometer of claim 1, wherein a magnet is disposed in said housing to securely adhere to a metallic surface when said temperature sensing probe is inserted into said metallic surface.

6. The hand-held thermometer of claim 1, wherein a pocket clip is disposed on said housing.

7. The hand-held thermometer of claim 6, wherein said pocket clip engages a battery compartment.

8. A hand-held thermometer comprising:
   a housing;
   a temperature sensing probe engaged to the housing, said temperature sensing probe terminating in a probe tip;
   a digital processing circuit disposed within said housing configured to receive a signal from said temperature sensing probe;
   a display connected to said digital processing circuit configured to display a visual indication of temperatures sensed by said temperature sensing probe;
   a probe cover configured to envelop said temperature sensing probe and to securely engage said housing; and
   an opening in said probe cover configured to expose the probe tip of said temperature sensing probe, the opening extending past the tip with the cover securely engaged to the housing.

9. The hand-held thermometer of claim 8, wherein an additional opening is disposed opposite said opening on the probe cover.

10. The hand-held thermometer of claim 8, wherein said opening exposes the entire width of said temperature sensing probe.

11. The hand-held thermometer of claim 8, wherein said probe cover can be securely engaged to an alternate position on said housing.

12. The hand-held thermometer of claim 8, wherein a magnet is disposed in said housing to securely adhere to a metallic surface when said temperature sensing probe is inserted into said metallic surface.

13. The hand-held thermometer of claim 12, wherein a pocket clip is disposed on said housing.

14. The hand-held thermometer of claim 13, wherein said pocket clip engages a battery compartment.

\* \* \* \* \*